US009882453B2

(12) United States Patent
Schlesier et al.

(10) Patent No.: US 9,882,453 B2
(45) Date of Patent: Jan. 30, 2018

(54) METHOD FOR PROVIDING A FREQUENCY RESPONSE FOR A COMBINED CYCLE POWER PLANT

(71) Applicant: ALSTOM Technology Ltd, Baden (CH)

(72) Inventors: Jan Schlesier, Wettingen (CH); Hamid Olia, Zürich (CH); Martin Schoenenberger, Zürich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 407 days.

(21) Appl. No.: 14/182,390

(22) Filed: Feb. 18, 2014

(65) Prior Publication Data

US 2014/0239638 A1 Aug. 28, 2014

(30) Foreign Application Priority Data

Feb. 22, 2013 (EP) ..................................... 13156292

(51) Int. Cl.
*H02K 7/18* (2006.01)
*F01K 23/10* (2006.01)

(52) U.S. Cl.
CPC ......... *H02K 7/1823* (2013.01); *F01K 23/101* (2013.01); *H02K 7/183* (2013.01); *Y02E 20/16* (2013.01)

(58) Field of Classification Search
CPC .... H02K 7/183; H02K 7/1823; F01K 23/101; Y02E 20/16

(Continued)

(56) References Cited

U.S. PATENT DOCUMENTS 3,230,444 A * 1/1966 Lavell ..................... H02P 9/305
322/73
3,878,401 A * 4/1975 Ronnen ................... F01D 17/18
290/40 R (Continued)

FOREIGN PATENT DOCUMENTS

CN 101539287 B 1/2011
CN 102393004 A 3/2012
(Continued)

OTHER PUBLICATIONS

Balling, Lothar, "Fast cycling and rapid start-up: new generation of plants achieves impressive results", 2011, Modern PowerSystems. com, Siemens AG, 8pg.*

(Continued)

*Primary Examiner* — Ryan Coyer

(57) ABSTRACT

The disclosure refers to a method for providing a frequency response for a combined cycle power plant connected to an electric grid. The combined cycle power plant includes a gas turbine engine and a steam turbine engine. The steam turbine engine includes a boiler, a steam turbine, a pump, a condenser, a bypass for the steam turbine, a steam admission control valve. The steam turbine engine operates with the bypass closed or at least partly open to supply steam from the boiler to the condenser bypassing the steam turbine, and/or with the steam admission control valve at least partly open. The method comprises regulating the output load of the combined cycle power plant by regulating the steam admission control valve and/or by regulating the steam flow through the bypass in response to a frequency change of the electric grid. The output of the gas turbine can also be adjusted, such that steam generated by the boiler is sufficient to achieve the target load for the steam turbine.

12 Claims, 6 Drawing Sheets

(58) Field of Classification Search
USPC .......................................................... 700/288
See application file for complete search history.

(56) References Cited

U.S. PATENT DOCUMENTS

| | | | | |
|---|---|---|---|---|
| 3,879,616 | A * | 4/1975 | Baker | F01K 13/02 |
| | | | | 290/2 |
| 4,317,049 | A * | 2/1982 | Schweppe | H02J 3/14 |
| | | | | 307/129 |
| 4,868,539 | A * | 9/1989 | Foord | H02J 13/0031 |
| | | | | 340/12.33 |
| 6,978,620 | B2 | 12/2005 | Cooper et al. | |
| 7,383,791 | B2 | 6/2008 | Franke et al. | |
| 7,406,928 | B2 | 8/2008 | Franke et al. | |
| 7,587,133 | B2 | 9/2009 | Franke et al. | |
| 7,874,162 | B2 | 1/2011 | Tomlinson et al. | |
| 9,062,918 | B2 | 6/2015 | He et al. | |
| 9,234,246 | B1 * | 1/2016 | Davis | C12Q 1/6886 |
| 2007/0063519 | A1 * | 3/2007 | Wobben | F03D 7/0284 |
| | | | | 290/44 |
| 2007/0132249 | A1 | 6/2007 | Andrew et al. | |
| 2008/0115743 | A1 | 5/2008 | Effert et al. | |
| 2009/0071419 | A1 | 3/2009 | Franke et al. | |
| 2009/0277183 | A1 | 11/2009 | Guzman et al. | |
| 2009/0320493 | A1 * | 12/2009 | Olia | F01D 17/145 |
| | | | | 60/773 |
| 2011/0018265 | A1 | 1/2011 | Hoffmann et al. | |
| 2011/0071692 | A1 * | 3/2011 | D'Amato | G05B 17/02 |
| | | | | 700/291 |
| 2011/0115445 | A1 | 5/2011 | Bronicki et al. | |
| 2011/0270451 | A1 * | 11/2011 | Sakaguchi | F01N 5/04 |
| | | | | 700/288 |
| 2012/0286524 | A1 | 11/2012 | Bronicki | |

FOREIGN PATENT DOCUMENTS

| | | |
|---|---|---|
| DE | 102008029941 | 5/2009 |
| DE | 10 2008 062 588 | 6/2010 |
| DE | 102005005472 B4 | 7/2012 |
| EP | 2 056 421 | 5/2009 |
| KR | 567907 B1 | 7/2005 |
| RU | 2121746 C1 | 11/1998 |
| SU | 505085 A | 1/1977 |

OTHER PUBLICATIONS

Lalor et al., "Frequency Control on an Island Power System with Increasing Proportions of Combined Cycle Gas Turbines", IEEE, 2003, 7pg.*

Mantzaris et al., "Modelling and Stability of a Single-Shaft Combined Cycle Power Plant", 2007, Int. J. of Thermodynamics, vol. 10 (No. 2), p. 71-78.*

Shin et al., "Analysis of the dynamic characteristics of a combined-cycle power plant", 2002, Elsevier Science Ltd., 14pg.*

Ahn et al., Power-Sharing Method of Multiple Distributed Generators Considering Control Modes and Configurations of a Microgrid, IEEE, 2010, 10pg.*

Aik, Denis Lee Hau, "A General-Order System Frequency Response Model Incorporating Load Shedding: Analytic Modeling and Applications", IEEE, 2006, 9pg.*

Gabash et al., "Active-Reactive Optimal Power Flow in Distribution Networks With Embedded Generation and Battery Storage", IEEE, 2012, 10pg.*

Bennauer et al., "Automation and Control of Electric Power Generation and Distribution Systems: Steam Turbines"; Control Systems, Robotics and Automation—vol. XVIII, 2010, 10pg.*

Ordys et al., "Modelling and Simulation of Power Generation Plants", Springer-Verlag, 1994, 326pg.*

"Turbine Bypass Condenser Dump Applications", Emerson Process Managment, 2002, 8pg.*

Office Action issued in connection with corresponding EP Application No. 14154495.7 dated Jan. 11, 2017.

* cited by examiner

METHOD FOR PROVIDING A FREQUENCY RESPONSE FOR A COMBINED CYCLE POWER PLANT

CROSS-REFERENCE TO RELATED APPLICATIONS

This application claims priority to European application 13156292.8 filed Feb. 22, 2013, the contents of which are hereby incorporated in its entirety.

TECHNICAL FIELD

The present disclosure relates to a method for providing a frequency response for a combined cycle power plant.

BACKGROUND

Combined cycles power plants are known to include a gas turbine engine and a steam turbine engine. The steam turbine engine has a boiler that is supplied with the exhaust gas from the gas turbine engine to produce steam that is expanded in a steam turbine. The steam turbine engine and gas turbine engine drive one or more electric generators that are connected to an electric grid to supply electric power to it.

As known, the frequency of the electric power of the grid has a nominal value that is fixed (50 Hz or 60 Hz) and the deviation from this nominal value shall be kept to a minimum.

Nevertheless, because of mismatch between the electric power supplied to the grid by the power plants connected to it and the electric drained from the grid by consumers connected to it, the frequency of the grid can deviate from the nominal value.

When this happens, some power plants connected to the grid must be regulated in order to bring the frequency of the grid back to the nominal value.

Typically, the frequency of the grid may increase above or decrease below its nominal value.

In case the frequency drops to a value lower than the nominal value, the power plants connected to the grid must provide additional electric power to the grid in a very short time, to restore the grid frequency.

In case the frequency increases to a value higher than the nominal value, the power plants connected to the grid must reduce the electric power provided to the grid in a very short time, to restore the grid frequency.

Traditionally, this change in power supplied to the grid is achieved by increasing or reducing the power generated at the gas turbine engine by increasing or reducing the fuel provided in the combustion chamber of the gas turbine engine (this power is then converted through a generator in electric power that is supplied to the grid).

Nevertheless, when the combined cycle power plant is operated at a low operating point (i.e. at a low fraction of the nominal or full power of the gas turbine, for example 40%) a fast regulation of the gas turbine is not possible.

In fact, a regulation of the gas turbine at low load could cause unacceptable un-combusted hydro carbon and/or $NO_x$ emission, pulsations, flame extinction.

SUMMARY

An aspect of the disclosure includes providing a method for providing a frequency response for a combined cycle power plant that is operating at a low operating point.

These and further aspects are attained by providing a method in accordance with the accompanying claims.

BRIEF DESCRIPTION OF THE DRAWINGS

Further characteristics and advantages will be more apparent from the description of a preferred but non-exclusive embodiment of the method, illustrated by way of non-limiting example in the accompanying drawings, in which.

DETAILED DESCRIPTION

With reference to the figures, a method for providing a frequency response for a combined cycle power plant is described. The combined cycle power plant is described first.

Figure 6:
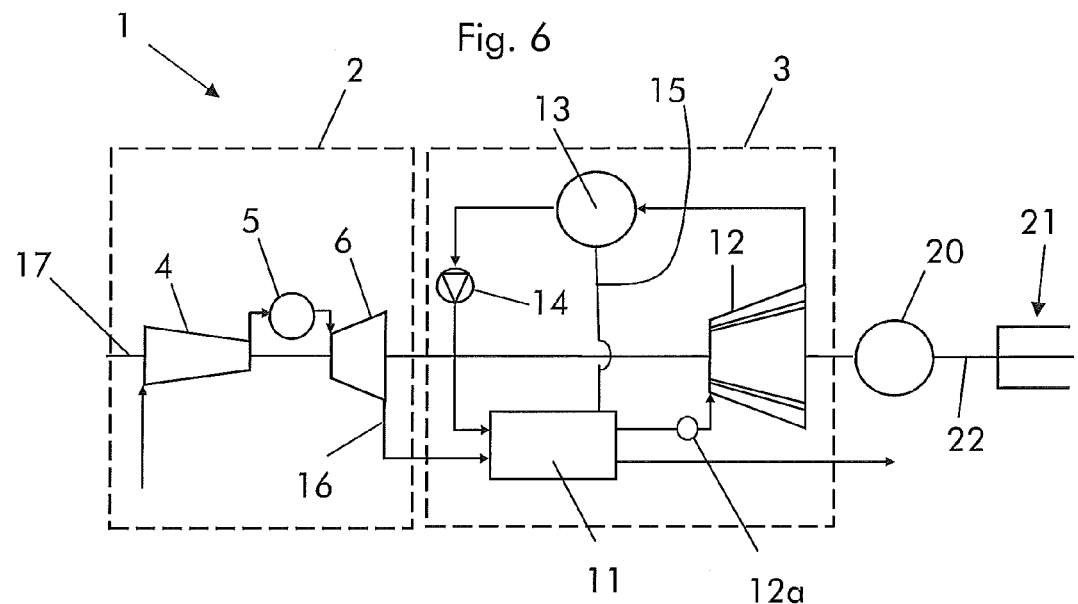
FIGS. 6 and 7 show two examples of combined cycle power plants.

FIG. 6 shows a first example of combined cycle power plant that includes a gas turbine engine 2 and a steam turbine engine 3.

The gas turbine engine 2 has a compressor 4, a combustion chamber 5 and a turbine 6.

From the turbine 6 exhaust gas is discharged, this exhaust gas derives from the expansion in the turbine 6 of the hot gas generated in the combustion chamber 5 by combustion of compressed air from the compressor 4 and fuel.

The steam turbine engine 3 has a boiler 11, a steam turbine 12 a condenser 13, a pump 14 and a bypass 15 between the boiler 11 and the condenser 13. In addition, reference 12a indicates a steam admission control valve provided between the boiler 11 and the steam turbine 12 to regulate the steam mass flow supplied to the steam turbine 12.

A line 16 is provided between the turbine 6 and the boiler 11 to provide the exhaust gas from the turbine into the boiler 11, in order to produce steam.

The turbine 6 and the steam turbine 12 are connected to one shaft 17 that carries also the compressor 4, and a generator 20; the generator 20 in connected to an electric grid 21 via an electric line 22.

The grid 21 is a typical grid with power plants (like the combined cycle power plant 1) and consumers (machines, networks, etc) connected to it; typically the grids are operated a 50 Hz or 60 Hz (nominal grid frequency).

Figure 7:
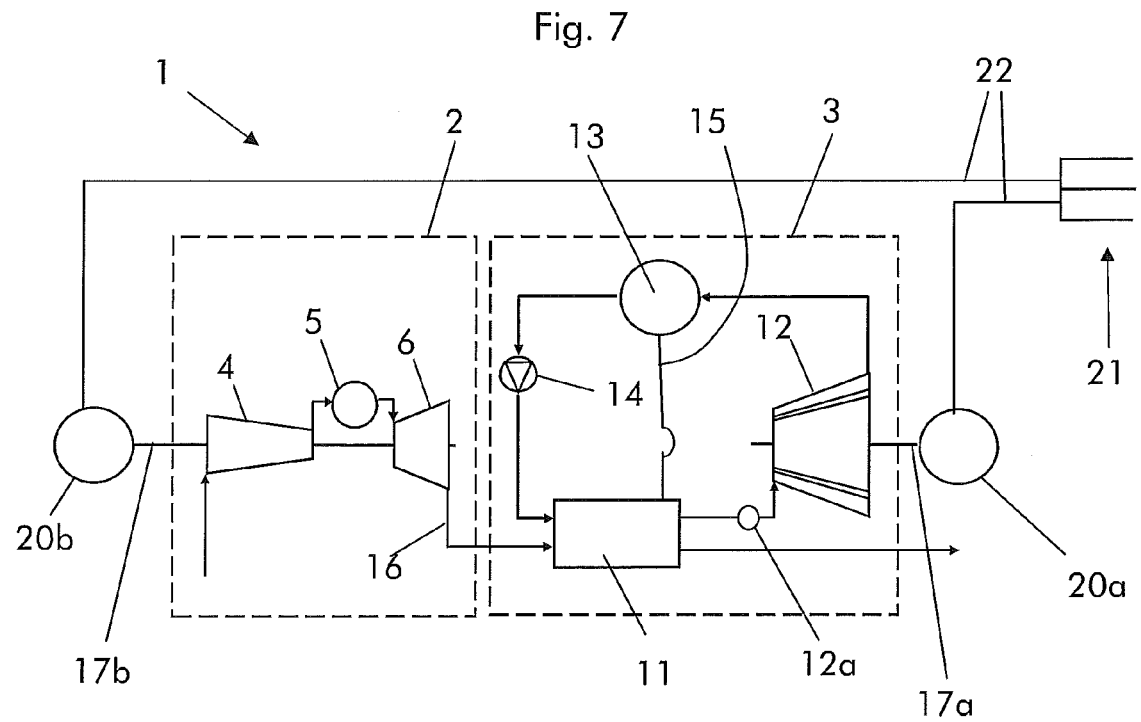

FIG. 7 shows a similar combined cycle power plant and in this figure same reference numbers as in FIG. 6 identify same or similar components.

The difference between the power plants of FIG. 7 and FIG. 6 lies in that the power plant of FIG. 7 has two shafts 17a, 17b and two generators 20a, 20b connected to the grid 21.

During operation, the gas turbine engine 2 and steam turbine engine 3 produce mechanical power to activate the generators 20, 20a, 20b that generate electric power that is supplied to the grid 21.

In particular, when the operating point of the combined cycle power plant 1 is very low (i.e. when the power generated by the combined cycle power plant is between 0-45% and preferably 0-20% of the power generated by the power plant at full load), the bypass 15 can be closed or open or partially open such that a part of the steam generated at the boiler 11 is conveyed into the steam turbine 12 and a part of the steam is conveyed directly into the condenser without passing through the steam turbine 12. In addition, the steam admission control valve 12a is usually open or partly open.

In other words, the operation at low load can occur with bypass 15 open or partly open and/or steam admission control valve 12a open or partly open. It is clear that the bypass 15 can also be closed.

In case of mismatch of electric power supplied to the grid 21 by the power plants 1 connected to it and the electric power absorbed from the grid 21 by the consumers such as machines or networks connected to it, the frequency of the grid 21 changes.

When the frequency of the grid drops, in order to restore the grid frequency, the electric power provided to the grid must be increased; likewise when the frequency of the grid increases, in order to restore the grid frequency, the electric power provided to the grid must be decreased. These regulations must be done preferably in a short period to avoid that the machines connected to the grid loose synchronisation.

According to this disclosure, the method comprises regulating the output load of the steam turbine engine 3 by regulating the steam admission control valves 12a of the steam turbine 12 and/or regulating the steam flow through the bypass 15 in response to a frequency change of the grid 21.

In particular, when the frequency change is a frequency drop, the regulation of the output load of the steam turbine engine 3 is an increase of power output and when the frequency change is a frequency rise, the regulation of the output load of the steam turbine engine 3 is a decrease of power output.

In addition, also the gas turbine engine output load can be adjusted, this is anyhow not mandatory (i.e. the gas turbine engine 2 can also not be adjusted).

For example, in this case the gas turbine engine output load is adjusted in order to regulate the amount of steam generated at the boiler 11.

In case of a drop of the grid frequency, the regulation of the output load of the gas turbine engine is an increase of power output and in case of an increase of the grid frequency, the regulation of the output load of the gas turbine engine is a decrease of power output.

Typically the regulation of the output load of the steam turbine engine 3 includes:
 a transient load variation phase A (increase or decrease)
 a stabilisation phase B
 a normalisation phase C.

During the phase A the regulation of the output load of the steam turbine engine 3 is typically faster than the adjustment of the output load of the gas turbine engine 2. This feature is shown in the attached figures that show that the curve 25 indicating the power output increase of the steam turbine engine 3 has a greater gradient than the curve 26 indicating the power output gradient of the gas turbine engine 2 during phase A.

In addition, at the end of the end phase C the output load of the gas turbine engine 2 and the output load of the steam turbine engine 3 is the same as the output load of the gas turbine engine 2 and the output load of the steam turbine engine 3 before regulation.

Also the regulation of the output load of the gas turbine engine 3 includes
 a transient load variation phase phase D
 an stabilisation phase E
 an normalization phase F.

Preferably, the transient load variation phase A for the regulation of the output load of the steam turbine engine 3 is shorter than the transient load variation phase D for the regulation of the output load of the gas turbine engine 2.

In addition, the normalization phase C for the regulation of the output load of the steam turbine engine 3 is shorter than the normalization phase F for the regulation of the output load of the gas turbine engine 2.

Moreover, the power output of the plant prior to the frequency disturbance can be zero and a frequency increase above the nominal value can cause the steam turbine and/or gas turbine to reduce load and yield to an import of active power by the power plant.

The attached figures show different examples of the method as explained in the following.

EXAMPLE 1

FIG. 1

In the first example the frequency of the grid drops from 50 Hz to 49.5 Hz.

The frequency drop causes an increase of the output power from the steam turbine engine 3 during a phase A and a corresponding increase of the output power from the gas turbine engine 2 for a phase D longer than the phase A. In addition the gradient of the output power increase from the steam turbine engine 3 is higher than the gradient of the output power increase of the gas turbine engine 2.

After the phases B and E, the phases C and F show that the decrease of the output power from the steam turbine engine 3 during the phase C is shorter and with a larger gradient than the decrease of the output power from the gas turbine engine 2 during the phase F.

EXAMPLE 2

FIG. 2

In the second example the frequency drop of the grid is small because the grid frequency drops from 50 Hz to 49.9 Hz.

Figure 1:
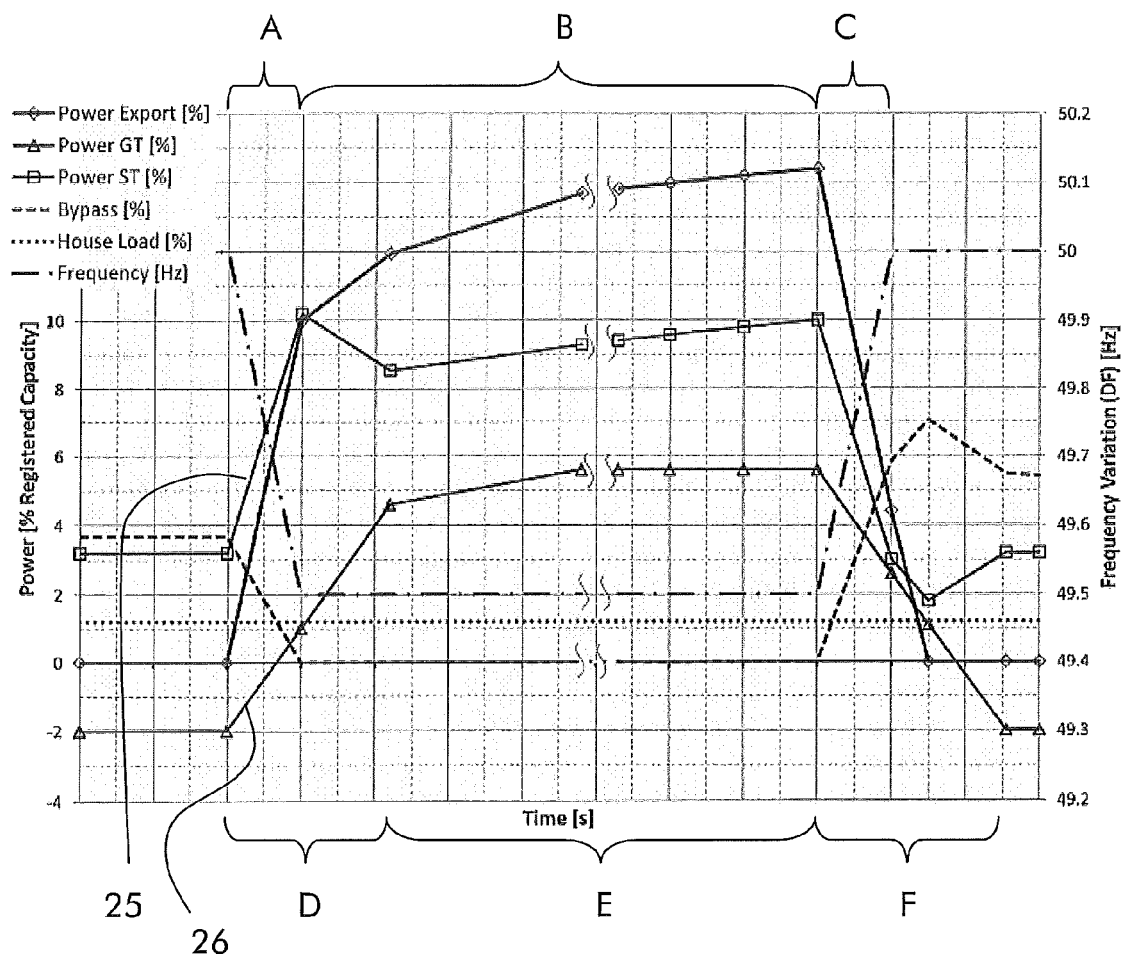
FIGS. 1 through 5 show possible embodiments of the method.
Figure 2:
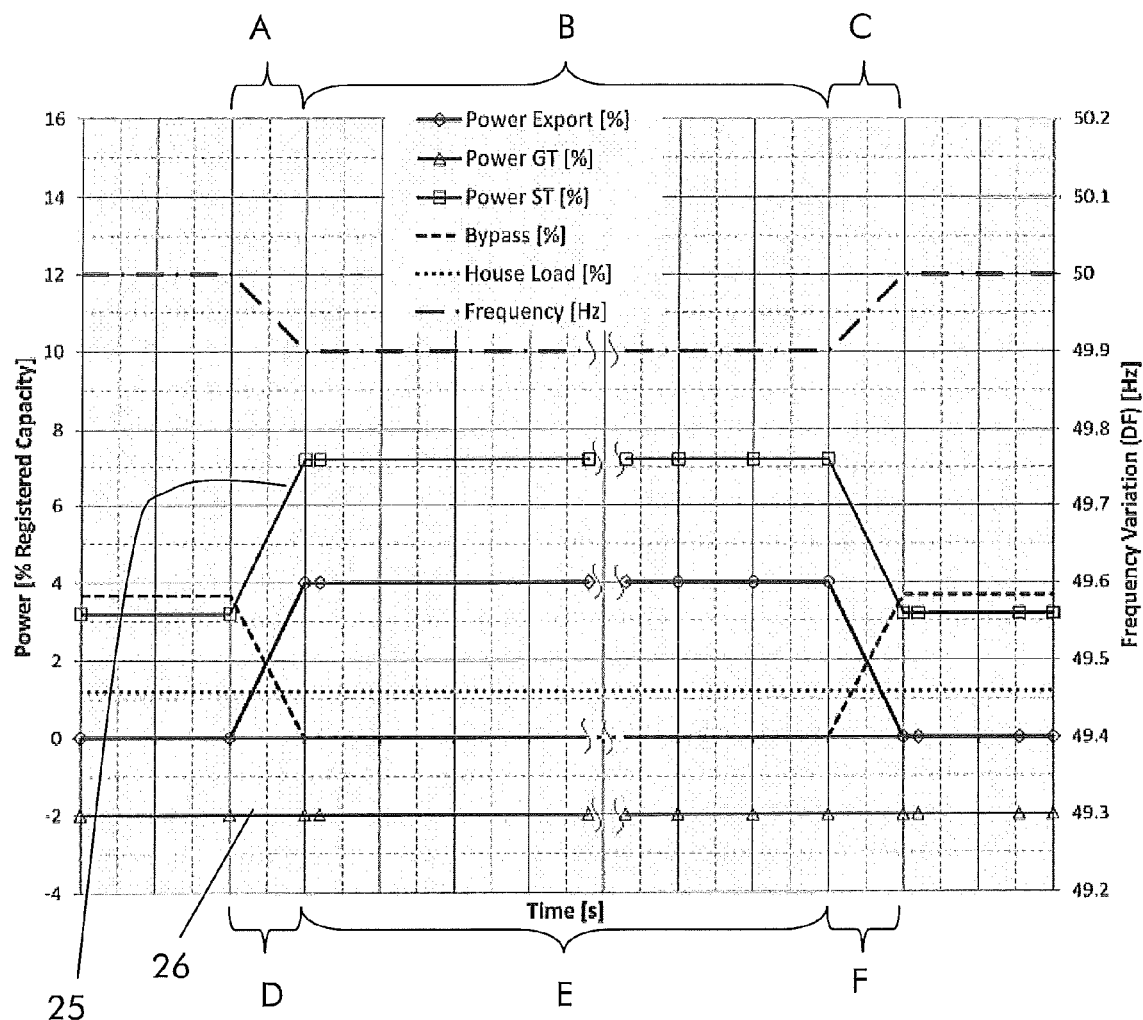
Figure 3:
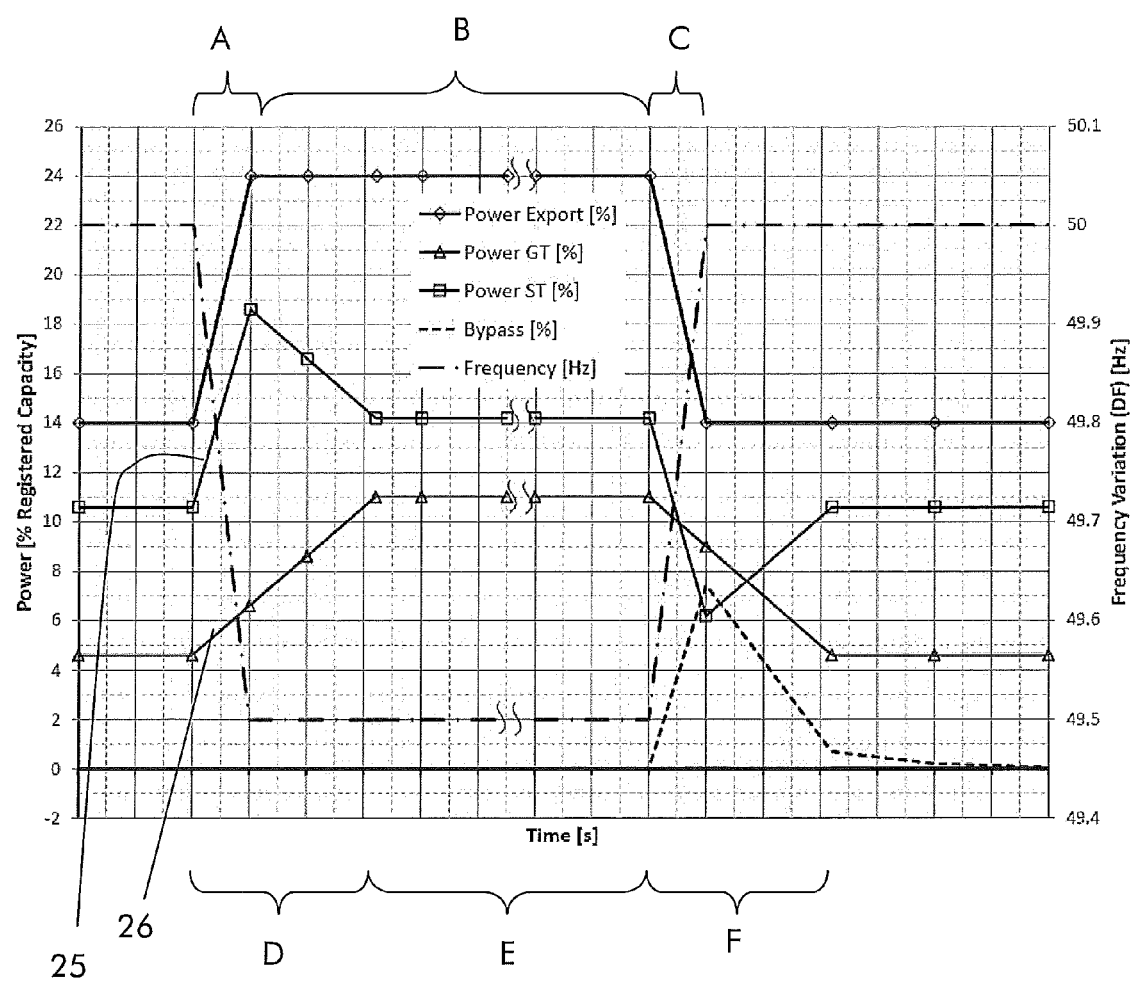
Figure 4:
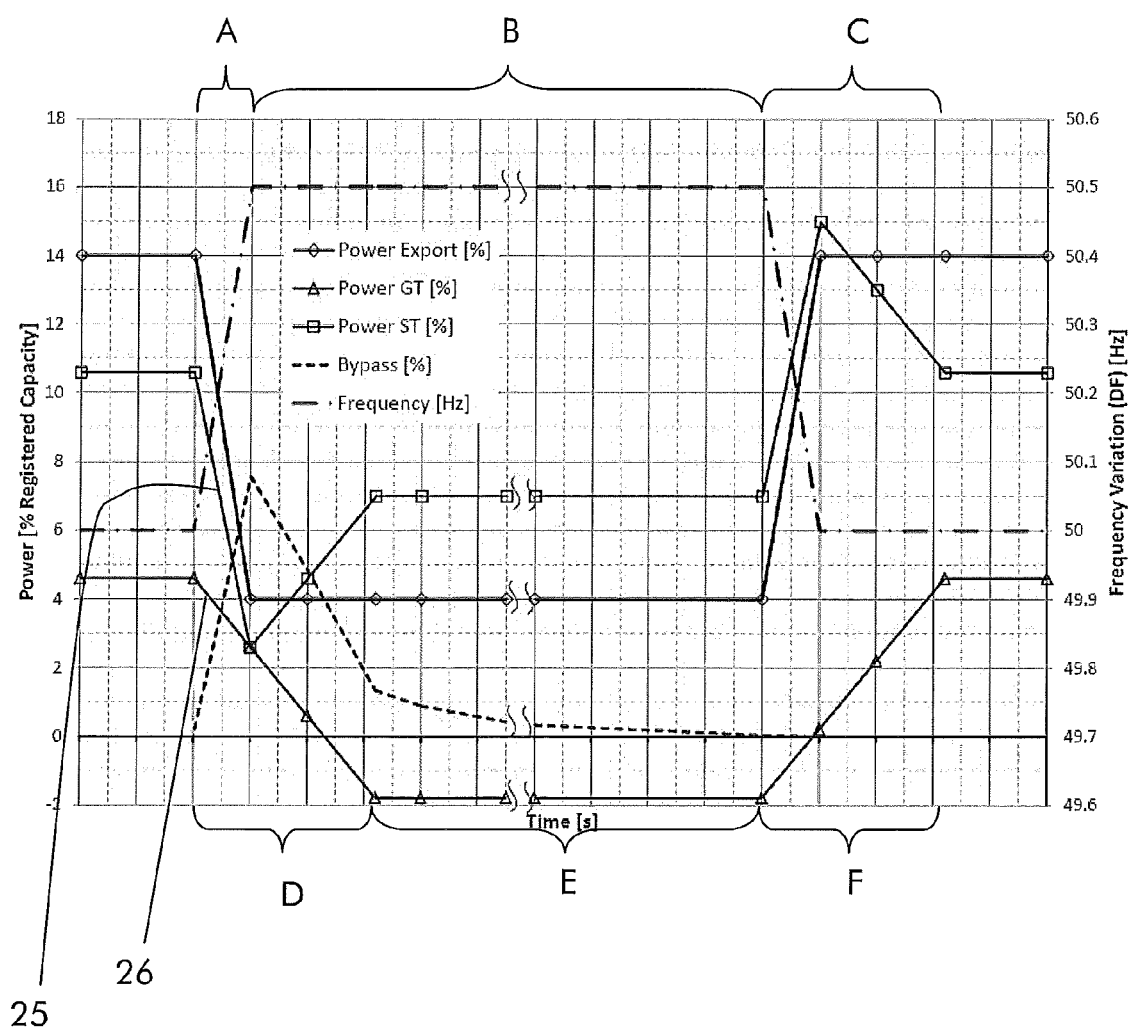
Figure 5:
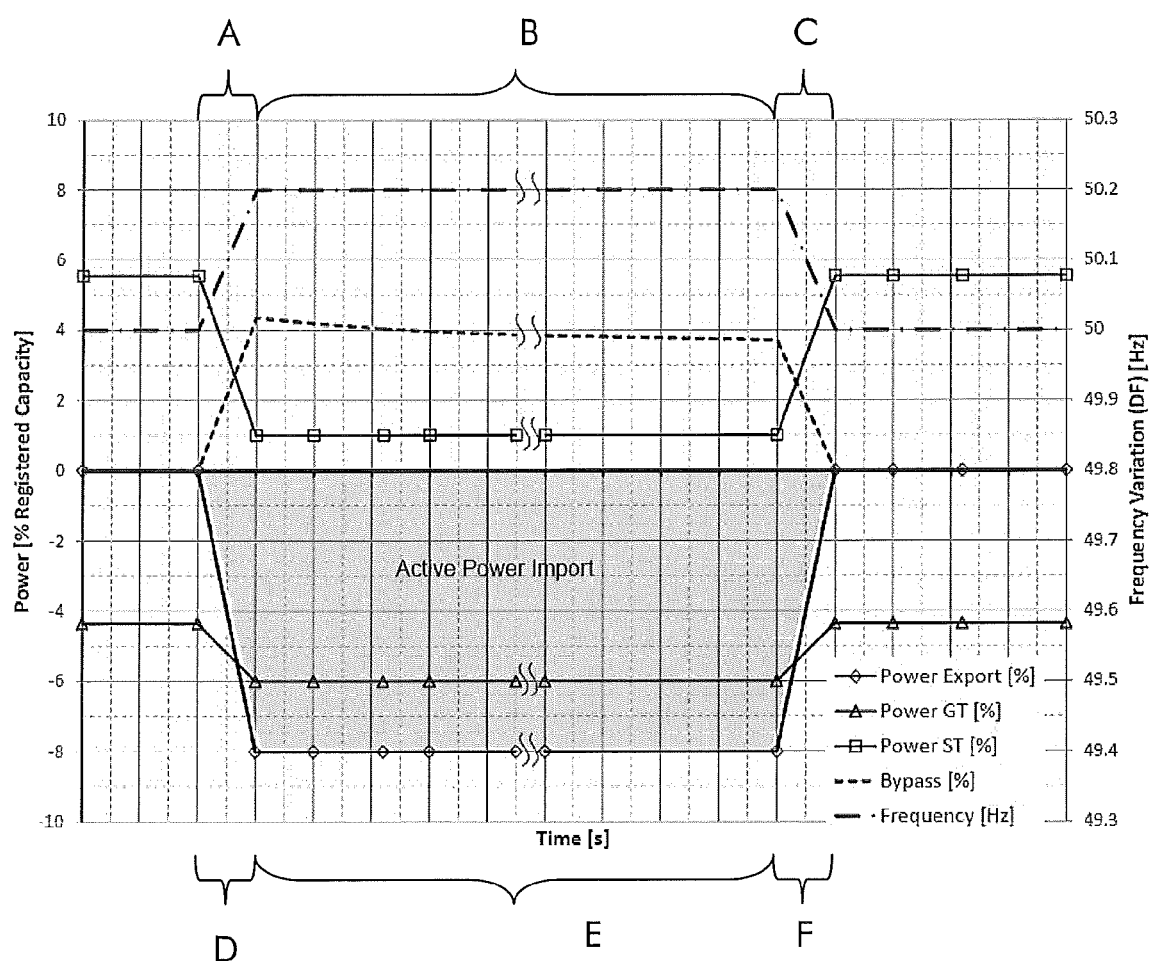

In this case as shown in FIG. 2, the output power from the steam turbine engine 3 has behaviour similar to the one already described in example 1.

In particular, the output power from the gas turbine engine 2 is not regulated, i.e. it does not change. This is caused by the fact that since the frequency drop of the grid is limited, the regulation of the output power that can be achieved by regulating the steam admission control valves and/or the bypass 15 is sufficient to restore the grid 21. In other words, there is no need to provide additional energy to the boiler 11 of the steam turbine engine 3 for it to produce the power needed to activate the generators 20, 20a, 20b to produce the additional electric power to supply to the grid 21; when needed, additional energy is supplied to the boiler 11 by increasing the thermodynamic features of the exhaust gas from the turbine 6, i.e. by increasing the fuel provided into the combustion chamber 5.

EXAMPLE 3

FIG. 3

The example 3 shows another example of response to a frequency decrease.

The gas turbine 2 and steam turbine 3 respond simultaneously; the steam turbine load is increased with fast gradient by opening the throttled steam admission control valves of the steam turbine 3.

The bypass 15 remains closed during loading of the steam turbine engine 3 and the bypass 15 opens temporarily to support only during de-loading of the steam turbine engine 3 by directing the surplus in steam production into the condenser 13.

The gas turbine 2 increases its load such that steam production is sufficient for generating the required load during the stabilisation phase B.

EXAMPLE 4

FIG. 4

The example 4 shows an example of response to a frequency increase.

In this case the gas turbine 2 and steam turbine 3 respond simultaneously. The steam turbine load is reduced with fast gradient by operating the steam admission control valves 12a of the steam turbine and the bypass 15 opens temporarily to support the de-loading of the steam turbine 3 by directing the surplus in steam production into the condenser 13.

The gas turbine 2 reduces its load such that steam production is sufficient for generating the required load.

In this case, the gas turbine load can also become negative.

Moreover, the bypass 15 closes gradually to zero during the stabilisation phase B.

EXAMPLE 5

FIG. 5

In this example the frequency of the grid increases from 50 Hz to 50.2 Hz.

In this case, the output power of the plant has to decrease.

Since the power output of the plant prior to the frequency disturbance is zero the additional reduction of steam turbine and or gas turbine load results in an active power import of the power plant.

The proposed method has the following characteristics:
the steam turbine controls the total load of the combined-cycle power plant,
the steam turbine has the capacity for load augmentation and load reduction,
with the demand for a load variation (e.g. following a frequency deviation) the gas turbine load is preferably adjusted such that the required total power output of the unit can be met on a sustainable basis:
  a. Adjustment of the gas turbine load may or may not be required,
  b. If the adjustment of the gas turbine load is required it is adjusted such that resulting change in steam production is sufficient to meet the total load demand for the unit,
  c. temporary or sustained bypass operation supports the steam turbine and thereby unit load control,
  d. The steam turbine engine responds immediately to a change in total load demand for the power plant. If required, the gas turbine load is adjusted simultaneously or with a time lag with respect to the steam turbine engine output load regulation.

In general the steam turbine engine response to a change in total load demand for the combined cycle power plant is faster than the response of the gas turbine engine (load gradient of the steam turbine engine is higher than the load gradient of the gas turbine engine).

In practice the materials used and the dimensions can be chosen at will according to requirements and to the state of the art.

The invention claimed is:

1. A method for providing a frequency response for a combined cycle power plant connected to an electric grid, wherein the combined cycle power plant comprises a gas turbine engine and a steam turbine engine, the steam turbine engine comprises a boiler providing steam to a steam turbine, a pump, a condenser connected to an output of the steam turbine, a bypass for the steam turbine between the boiler and the condenser, a steam admission control valve, the steam turbine engine operates by manipulating the bypass between the boiler and the condenser and by manipulating the steam admission control valve, the method comprising:
  regulating the output load of the steam turbine engine in response to a frequency change of the electric grid by increasing steam flow through the bypass between the boiler and the condenser when the frequency of the electric grid increases, wherein the regulation of the output load of the steam turbine engine includes at least a transient load variation phase (A) where the regulation of the output load of the steam turbine engine is faster than the regulation of the output load of the gas turbine engine.

2. The method of claim 1, further comprising adjusting the gas turbine engine output load.

3. The method of claim 2, further comprising:
  supplying the boiler with exhaust gas discharged from the gas turbine engine, and
  adjusting the gas turbine engine output load such that the amount of steam generated by the boiler is sufficient to achieve the target load of the steam turbine.

4. The method of claim 1, wherein the regulation of the output load of the steam turbine engine further includes at least
  a stabilization phase (B); and
  a normalization phase (C).

5. The method of claim 2 wherein the end of a normalization phase (C) the output load of the gas turbine engine and the output load of the steam turbine engine is the same as the output load of the gas turbine engine and the output load of the steam turbine engine before regulation.

6. The method of claim 2, wherein the adjustment of the output load of the gas turbine engine includes at least
  a transient load variation phase (D);
  a stabilization phase (E); and
  a normalization phase (F).

7. The method of claim 1, wherein the transient load variation phase (A) for the regulation of the output load of the steam turbine engine is shorter than a transient load variation phase (D) for the adjustment of the output load of the gas turbine engine.

8. The method of claim 4 wherein the normalization phase (C) for the regulation of the output load of the steam turbine engine is shorter than a normalization phase (F) for the adjustment of the output load of the gas turbine engine.

9. The method of claim 2, further comprising adjusting the gas turbine engine output load simultaneously or with a time lag with respect to the steam turbine engine output load regulation.

10. The method of claim 1, wherein the power output of the combined cycle power plant prior to the frequency disturbance is zero and a frequency increase above the nominal value causes the steam turbine to reduce load and yield to an import of active power by the combined cycle power plant.

11. The method of claim 10, wherein a frequency increase above the nominal value further causes the gas turbine to reduce load and yield to an import of active power by the combined cycle power plant.

12. The method of clam 1, wherein further regulation of the output load of the steam turbine engine in the response to a frequency change of the electric grid is carried out by decreasing steam flow through the bypass when the frequency of the electric grid decreases.

* * * * *